(12) United States Patent
Sokolov et al.

(10) Patent No.: US 6,934,946 B2
(45) Date of Patent: Aug. 23, 2005

(54) LIGHTWEIGHT NATIVE METHOD INVOCATION INTERFACE FOR JAVA COMPUTING ENVIRONMENTS

(75) Inventors: Stepan Sokolov, Fremont, CA (US); David Wallman, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 380 days.

(21) Appl. No.: 09/858,252

(22) Filed: May 15, 2001

(65) Prior Publication Data

US 2002/0174261 A1 Nov. 21, 2002

(51) Int. Cl.$^7$ .............................................. G06F 17/00
(52) U.S. Cl. .......................................... 718/1; 712/202
(58) Field of Search ............................ 718/1; 719/100, 719/310, 315, 316, 331; 717/139, 148, 162, 165; 709/1, 315

(56) References Cited

U.S. PATENT DOCUMENTS

| | | | | | |
|---|---|---|---|---|---|
| 5,875,335 | A | * | 2/1999 | Beard | 717/139 |
| 5,911,069 | A | * | 6/1999 | Beard | 709/315 |
| 6,067,577 | A | * | 5/2000 | Beard | 709/331 |
| 6,167,565 | A | * | 12/2000 | Kanamori | 717/146 |
| 6,282,702 | B1 | * | 8/2001 | Ungar | 717/148 |
| 6,314,445 | B1 | * | 11/2001 | Poole | 718/1 |
| 6,327,606 | B1 | * | 12/2001 | Chidambaran | 709/104 |
| 6,381,734 | B1 | * | 4/2002 | Golde et al. | 717/165 |
| 6,481,006 | B1 | * | 11/2002 | Blandy et al. | 717/139 |
| 6,519,605 | B1 | * | 2/2003 | Gilgen et al. | 707/103 R |
| 6,651,248 | B1 | * | 11/2003 | Alpern | 717/162 |

OTHER PUBLICATIONS

Lindholm et al, "The Java™ Virtual Machine Specification", (Sep., 1996), Sun Microsystems, Inc., Chapters 1–10 (173 pp.).

Horstmann et al, "Core Java™² Vol. II—Advanced Features", (2000), Sun Microsystems, Inc., Chapter 11, pp. 843–899.

Steven McDougall, "XS Mechanics", Feb. 10, 2000, pp. 1–29 Internet:URL:world.std.com/{swmcd/steven/perl/pm/xs/concepts.html>.

Beazley et al., "Perl Extension Building with SWIG" Aug. 20, 1998, pp. 1–29, Internet: URL: .swig.org/papers/per198/swigperl.html>.

* cited by examiner

Primary Examiner—Meng-Al T. An
Assistant Examiner—Andy Ho
(74) Attorney, Agent, or Firm—Beyer Weaver & Thomas, LLP

(57) ABSTRACT

Improved techniques for invocations of native methods in Java computing environments are disclosed. The techniques can be implemented in Java computing environments to facilitate efficient use of methods (functions or subroutines) written in programming languages other than Java (e.g., C, C++, etc.). As such, the techniques are highly suitable for use by virtual machines operating with relatively less memory and/or computing power (e.g., embedded systems). A lightweight native method invocation interface can be implemented to provide direct access to Java parameters on the execution stack. In addition, the lightweight native method invocation can include macro instructions that operate efficiently to convert the Java parameters into native parameters. Thus, the lightweight native method invocation can significantly reduce the overhead associated with conventional Java native method invocation techniques. As a result, performance of virtual machines, especially those operating with relatively less memory and/or computing power, can be improved.

12 Claims, 3 Drawing Sheets

LIGHTWEIGHT NATIVE METHOD INVOCATION INTERFACE FOR JAVA COMPUTING ENVIRONMENTS

BACKGROUND OF THE INVENTION

The present invention relates generally to object-based high level programming environments, and more particularly, to techniques for invoking native methods in Java computing environments.

Recently, the Java programming environment has become quite popular. The Java programming language is a language that is designed to be portable enough to be executed on a wide range of computers ranging from small devices (e.g., pagers, cell phones and smart cards) up to supercomputers. Computer programs written in the Java programming language (and other languages) may be compiled into Java Bytecode instructions that are suitable for execution by a Java virtual machine implementation.

The Java virtual machine is commonly implemented in software by means of an interpreter for the Java virtual machine instruction set but, in general, may be software, hardware, or both. A particular Java virtual machine implementation and corresponding support libraries together constitute a Java runtime environment.

Computer programs in the Java programming language are arranged in one or more classes or interfaces (referred to herein jointly as classes or class files). Such programs are generally platform, i.e., hardware and operating system, independent. As such, these computer programs may be executed without modification on any computer that is able to run an implementation of the Java runtime environment.

Object-oriented classes written in the Java programming language are compiled to a particular binary format called the "class file format." The class file includes various components associated with a single class. These components can be, for example, methods and/or interfaces associated with the class. In addition, the class file format can include a significant amount of ancillary information that is associated with the class. The class file format (as well as the general operation of the Java virtual machine) is described in some detail in *The Java Virtual Machine Specification, Second Edition*, by Tim Lindholm and Frank Yellin, which is hereby incorporated herein by reference. A virtual machine operating in a Java computing environment allows for execution of native methods (functions or procedures) written in platform specific programming languages (native languages). In other words, the Java programming language allows invocation of native methods written in other programming languages (e.g., C, C++, etc.). This means that the processing of the native method is performed by a section of code written in the native programming language. Accordingly, there is a need to convert the parameters (e.g., Java primitive data types, Java reference objects) from Java programming language to parameters suitable for the native language.

To achieve this, recently, Java Native Interface (JNI) has been developed as an interface between the Java program and the native methods written in programming languages other than Java (e.g., C, C++, etc.). Using Java Native Interface (JNI), native methods are provided a reference (environment parameter). More particularly, every invocation of a native method passes a reference to a table of functions that are used to facilitate the conversion of parameters from Java to the native language. Thus, the Java Native Interface UNI) does not give direct access to Java parameters (e.g., Java primitive data types, Java reference objects). Instead, these parameters are accessed and indirectly through various Java Native Interface (JNI) methods which perform the conversation. More details about the Java Native Interface (JNI) are provided in *Core Java 2. Volume II—Advanced Features*, by Cay S. Horstmann and Gary Cornell, which is incorporated by reference herein for all purposes.

Although the Java Native Interface (JNI) provides a useful tool for invocation of native programs in Java computing environments, there is a significant cost associated with using the Java Native Interface (JNI). In other words, there is a significant amount of memory and runtime overhead associated with the use of the methods of the Java Native Interface (JNI). As a result, using the Java Native Interface UNI) can have adverse effects on the performance of virtual machines, especially those operating with relatively less memory and/or computing power (e.g., embedded systems).

In view of the foregoing, there is a need for alternative techniques for invocation of native methods in Java computing environments.

SUMMARY OF THE INVENTION

Broadly speaking, the present invention relates to improved techniques for invocation of native methods in Java computing environments. These techniques can be implemented in Java computing environments to facilitate use of methods (functions or subroutines) written in programming languages other than Java (e.g., C, C++, etc.). As will be appreciated, these techniques are highly suitable for use by virtual machines operating with relatively less memory and/or computing power (e.g., embedded systems).

In accordance with one aspect of the invention, a lightweight native method invocation interface is disclosed. In one embodiment, the lightweight native method invocation provides direct access to Java parameters on the execution stack. In addition, the lightweight native method invocation can include macro instructions that operate efficiently to convert the Java parameters into native parameters. Thus, the lightweight native method invocation can significantly reduce the overhead associated with conventional Java native method invocation techniques. As a result, performance of virtual machines, especially those operating with relatively less memory and/or computing power, can be improved.

The invention can be implemented in numerous ways, including as a method, an apparatus, a computer readable medium, and a database system. Several embodiments of the invention are discussed below.

As a method for invoking a native method written in a programming language other than Java, one embodiment of the invention includes the acts of: providing a reference to one or more Java parameters on a Java execution stack, the one or more Java parameters being parameters associated with the native method; and accessing at least one of the one or more Java parameters based on the reference.

As a method for invoking a native method written in a native programming language other than Java, one embodiment of the invention includes the acts of: providing a reference to one or more Java parameters associated with the native method on a Java execution stack; accessing at least one of the one or more Java parameters based on the reference; converting at least one Java parameter to a native parameter suitable for the native programming language. The converting is performed by a set of macro instructions written in the native programming language.

As a Java program, one embodiment of the invention includes a native method invocation instruction operating to invoke a native method written in a programming language other than Java. The method invocation instruction operates to provide a reference to an entry on an execution stack. The entry is a reference to at least one parameter associated with the method invocation instruction; and the reference is provided directly to a set of macro instructions.

As a computer readable media, one embodiment of the invention includes computer program code for a lightweight native Java method invocation interface operating in a Java computing environment to facilitate invocation of native methods written in a programming language other than Java. The computer program code includes code for a set of macro instructions. In addition, a reference to an execution stack is provided to a set of macro instructions. The reference provides a reference to at least one parameter associated with the method invocation instruction which is on the execution stack.

These and other aspects and advantages of the present invention will become more apparent when the detailed description below is read in conjunction with the accompanying drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The present invention pertains to improved techniques for invocations of native methods in Java computing environments. These techniques can be implemented in Java computing environments to facilitate use of methods (functions or subroutines) written in programming languages other than Java (e.g., C, C++, etc.). As will be appreciated, these techniques are highly suitable for use by virtual machines operating with relatively less memory and/or computing power (e.g., embedded systems).

In accordance with one aspect of the invention, a lightweight native method invocation interface is disclosed. In one embodiment, the lightweight native method invocation provides direct access to Java parameters on the execution stack. In addition, the lightweight native method invocation can include macro instructions that operate efficiently to convert the Java parameters into native parameters. Thus, the lightweight native method invocation can significantly reduce the overhead associated with conventional Java native method invocation techniques. As a result, performance of virtual machines, especially those operating with relatively less memory and/or computing power, can be improved.

Embodiments of the invention are discussed below with reference to FIGS. 1–3. However, those skilled in the art will readily appreciate that the detailed description given herein with respect to these figures is for explanatory purposes only as the invention extends beyond these limited embodiments.

Figure 1:
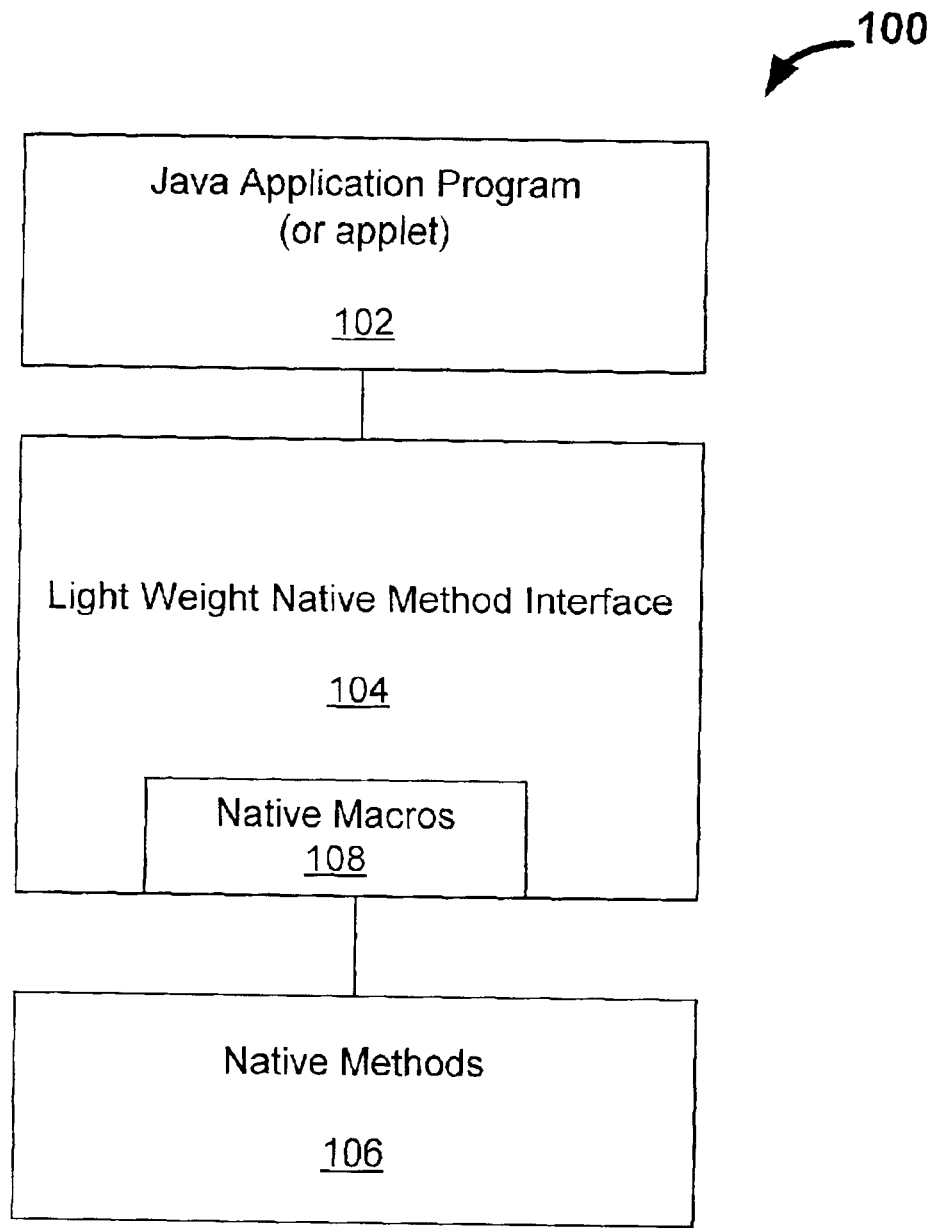
FIG. 1 represents a Java programming environment in accordance with one embodiment of the invention.

FIG. 1 represents a Java programming environment 100 in accordance with one embodiment of the invention. The Java programming environment 100 can be implemented by a virtual machine operating in a Java computing environment. As shown in FIG. 1, a Java application program (or applet) 102 uses a lightweight native method invocation interface 104 to access one or more native methods 106 written in a non-Java programming language (e.g., C, C++, etc.).

In the described embodiment, the lightweight native method invocation interface 104 includes a native macro portion 108 which provides the native methods 106 with access to the Java application program (or applet) 102. The native macro portion 108 represents computer instructions typically written in the same programming language as the native methods 106. The macro instructions provided in native macro portion 108 operate to access, and if necessary, convert the Java parameters (e.g., Java primitive data types, Java reference objects). Accordingly, the native macro portion 108 operates to provide access and convert the parameters very efficiently. In addition, the native macro portion 108 can insulate the native methods 106 from the virtual machine internals.

As will appreciated by those skilled in the art, the lightweight native method invocation interface 104 can access the Java parameters directly. In comparison to conventional techniques, the lightweight native method invocation interface 104 can significantly reduce the overhead associated with invocation of native methods in Java programming environments.

In one preferred embodiment, the lightweight native method invocation interface 104 provides access to the Java parameters stored on the execution stack. To illustrate, FIG. 2 depicts a Java computing environment 200 in accordance to one embodiment of the invention. The Java computing environment 200 includes a Java execution stack 202 and a native execution stack 204. It should be noted that to invoke a native method, the stack frame associated with the method is placed on the execution stack 202. The stack frame can include parameters of the native method which represent one or more Java data types. Accordingly, parameter 1, parameter 2, ... parameter N, shown in FIG. 2, represent Java parameters associated with the native method. These parameters are converted into native parameter 1, native parameter 2, ... native parameter M which are placed on the native execution stack 204 to perform the processing of the native method written in another programming language.

Figure 2:
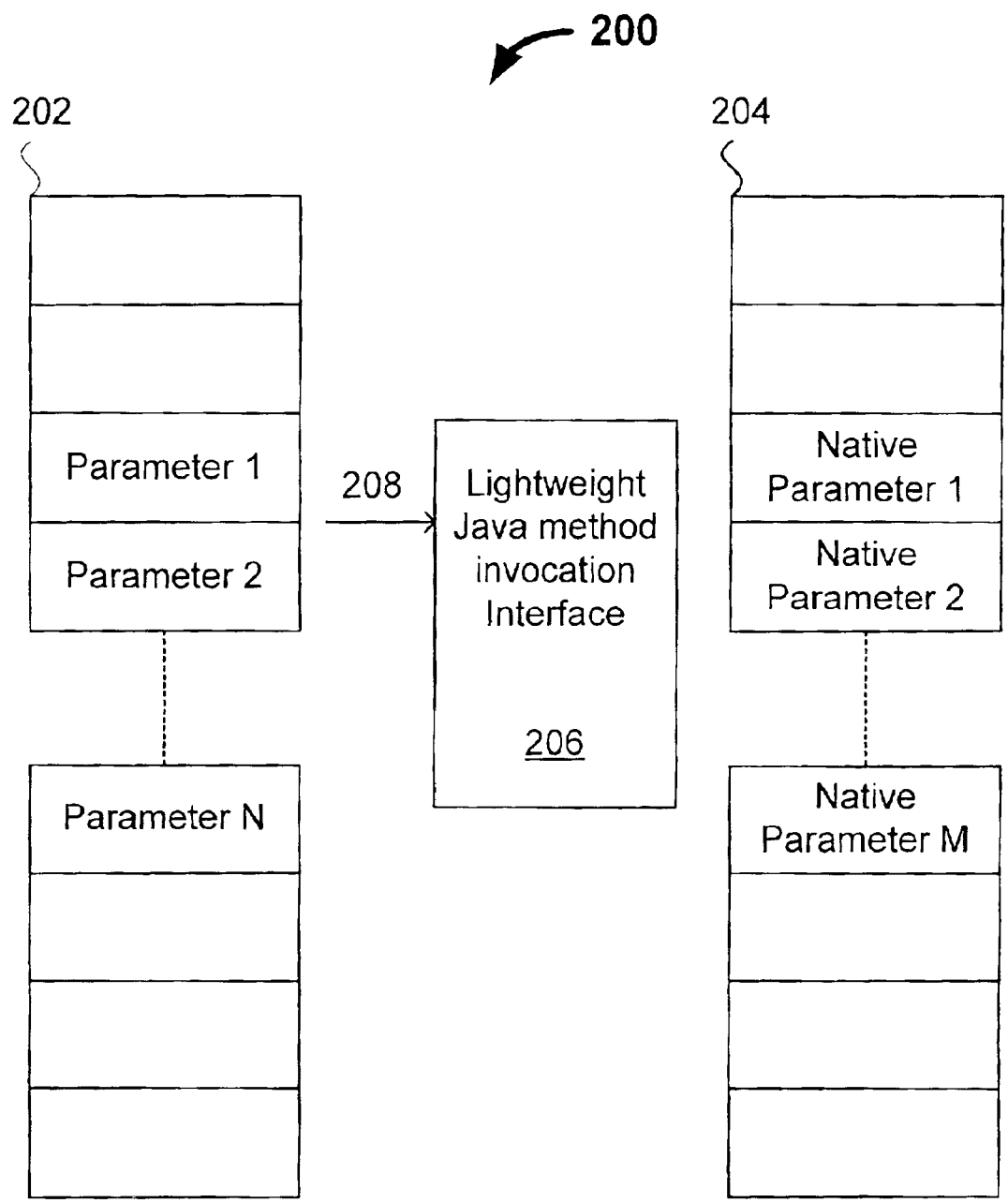
FIG. 2 represents a Java computing environment including a Java execution stack and a native execution stack.

As illustrated in FIG. 2, the lightweight Java native method invocation interface 206 accesses parameter reference 208. The parameter reference 208 is a reference to the parameter portion of the stack frame for the native method. Accordingly, parameter 1, parameter 2, ... parameter N of the native method can quickly be referenced by using the parameter reference 208 (i.e., use parameter reference [i] to access the $i^{th}$ parameters). Using the parameter reference 208, these parameters can be accessed and converted by the lightweight Java method invocation interface 206 to an appropriate set of native parameters which are, in turn, placed on the native execution stack 204 (native parameter 1, native parameter 2, ... native parameter M). It should be noted that native parameter 1, native parameter 2, ... native parameter M are suitable for use by the native method written in a native programming language.

Figure 3:
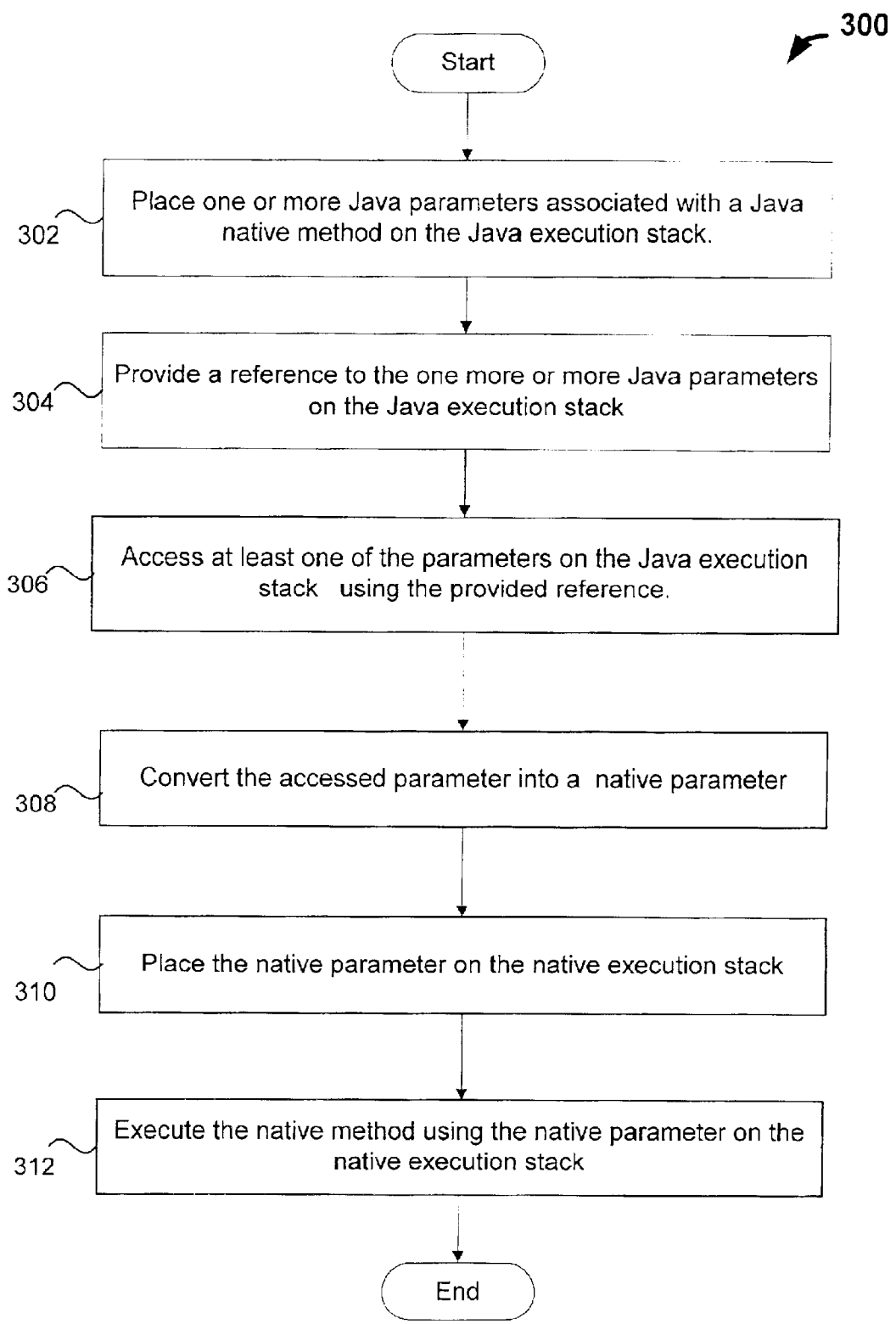
FIG. 3 illustrates a method for invocation of Java native methods in accordance with one embodiment of the invention.

FIG. 3 illustrates a method for invocation of Java native methods in accordance with one embodiment of the invention. Initially, at operation 302, one or more Java parameters associated with a Java native method are placed on a Java execution stack. Next, at operation 304, a reference is provided to the one more or more Java parameters on the Java execution stack. The reference can be provided, for example, to one or more macros written in a native programming language (i.e., a programming language other than Java). Thereafter, at operation 306, at least one of the parameters on the Java execution stack is accessed using the provided reference. After the parameter has been accessed, at operation 308 the accessed parameter is converted to a native parameter. Thereafter, the native parameter is placed on the native execution stack at operation 310. Finally, at operation 312, the native method is executed using the native parameter on the native execution stack.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. In a Java computing environment, a method of invoking a native method written in a native programming language without calling a Java Native Interface (JNI), said method comprising:

providing a set of macro instructions which are written in said native programming language with a direct reference to one or more Java parameters stored on a Java execution stack, wherein said one or more Java parameters are associated with said native method;

converting, by said set of macro instructions, said one or more Java parameters into at least one native parameter suitable for invocation of said native method, wherein said one or more Java parameters are converted by said converting without calling a Java Native Interface (JNI);

placing said at least one native parameter on a native execution stack associated with said native programming language after said converting operates to generate said at least one native parameter by accessing said direct reference; and invoking said native method with said at least one native parameter after said converting of said at least one native parameter and said placing of said at least one native parameter on said execution stack, thereby allowing said native method to be invoked without calling said Java Native Interface (JNI).

2. A method as recited in claim 1, wherein said set of macro instructions and said native method are written in C programming language.

3. A method as recited in claim 1, wherein said at least one Java parameter is a Java reference object or a Java primitive data type.

4. A method as recited in claim 1, wherein said set of macros operate to insulate the native method from the internals of a virtual machine that is invoking said native method.

5. A computer readable medium including computer program code for invoking a native method written in a native programming language without calling a Java Native Interface (JNI), said compute readable medium comprising:

computer program code for providing a set of macro instructions which are written in said native programming language with a direct reference to one or more Java parameters stored on a Java execution stack, wherein said one or more Java parameters are associated with said native method;

computer program code for converting, by said set of macro instructions, said one or more Java parameters into at least one native parameter suitable for invocation of said native method, wherein said one or more Java parameters are converted by said converting without calling a Java Native Interface (JNI);

computer program code for placing said at least one native parameter on a native execution stack associated with said native programming language after said converting operates to generate said at least one native parameter by accessing said direct reference; and computer program code for invoking said native method with said at least one native parameter after said converting of said at least one native parameter and said placing of said at least one native parameter on said execution stack, thereby allowing said native method to be invoked without calling said Java Native Interface (JNI).

6. A computer readable medium as recited in claim 5, wherein said native programming language is the C or C++ programming language.

7. A computer readable medium as recited in claim 5, wherein said at least one Java parameter is a Java reference object or a Java primitive data type.

8. A computer readable medium as recited in claim 5, wherein said set of macros operate to insulate the native method from the internals of a virtual machine that is invoking said native method.

9. A computer system, comprising:

at least one processor which supports a virtual machine capable of invoking a native method written in a native programming language without calling a Java Native Interface (JNI), wherein said virtual machine is capable of:

providing a set of macro instructions which are written in said native programming language with a direct reference to one or more Java parameters stored on a Java execution stack, wherein said one or more Java parameters are associated with said native method converting, by said set of macro instructions, said one or more Java parameters into at least one native parameter suitable for invocation of said native method, wherein said one or more Java parameters are converted by said converting without calling a Java Native Interface (JNI);

placing said at least one native parameter on a native execution stack associated with said native programming language after said converting operates to generate said at least one native parameter by accessing said direct reference; and invoking said native method with said at least one native parameter after said converting of said at least one native parameter and said placing of said at least one native parameter on said execution stack, thereby allowing said native method to be invoked without calling said Java Native Interface (JNI).

10. A computer system as recited in claim 9, wherein said native programming language is the C or C++ programming language.

11. A computer system as recited in claim 9, wherein said at least one Java parameter is a Java reference object or a Java primitive data type.

12. A computer system as recited in claim 9, wherein said set of macros operate to insulate the native method from the internals of said virtual machine.

\* \* \* \* \*

UNITED STATES PATENT AND TRADEMARK OFFICE
CERTIFICATE OF CORRECTION

PATENT NO. : 6,934,946 B2 Page 1 of 1
DATED : August 23, 2005
INVENTOR(S) : Sokolov et al.

It is certified that error appears in the above-identified patent and that said Letters Patent is hereby corrected as shown below:

Column 1,
Line 67, change "Interface UNI)" to -- Interface (JNI). --.

Column 2,
Line 16, change "Interface UNI)" to -- Interface (JNI). --.

Signed and Sealed this

Twenty-fourth Day of January, 2006

JON W. DUDAS
*Director of the United States Patent and Trademark Office*